United States Patent
Haruta et al.

(10) Patent No.: US 12,478,581 B2
(45) Date of Patent: Nov. 25, 2025

(54) POWDER FORMULATION FOR INTRANASAL ADMINISTRATION, AND MANUFACTURING METHOD THEREOF

(71) Applicant: SHIN NIPPON BIOMEDICAL LABORATORIES, LTD., Kagoshima (JP)

(72) Inventors: Shunji Haruta, Kagoshima (JP); Yo Sonoda, Kagoshima (JP)

(73) Assignee: Shin Nippon Biomedical Laboratories, Ltd., Kagoshima (JP)

( * ) Notice: Subject to any disclaimer, the term of this patent is extended or adjusted under 35 U.S.C. 154(b) by 0 days.

(21) Appl. No.: 17/595,381

(22) PCT Filed: May 1, 2020

(86) PCT No.: PCT/JP2020/018456
§ 371 (c)(1),
(2) Date: Nov. 15, 2021

(87) PCT Pub. No.: WO2020/230676
PCT Pub. Date: Nov. 19, 2020

(65) Prior Publication Data
US 2022/0183971 A1    Jun. 16, 2022

(30) Foreign Application Priority Data
May 16, 2019    (JP) .................. 2019-093150

(51) Int. Cl.
| A61K 9/19 | (2006.01) |
| A61K 9/00 | (2006.01) |
| A61K 9/50 | (2006.01) |
| A61K 45/06 | (2006.01) |

(52) U.S. Cl.
CPC .............. *A61K 9/0075* (2013.01); *A61K 9/19* (2013.01); *A61K 9/5036* (2013.01); *A61K 9/5084* (2013.01); *A61K 45/06* (2013.01)

(58) Field of Classification Search
CPC .................................................. A61K 9/0075
See application file for complete search history.

(56) References Cited

U.S. PATENT DOCUMENTS

| 2002/0012688 A1* | 1/2002 | Dohi .................. A61P 9/14 424/499 |
| 2002/0058624 A1* | 5/2002 | Hanyu ................ A61K 9/0075 514/1.1 |
| 2008/0096924 A1 | 4/2008 | Masuda et al. |
| 2008/0260848 A1 | 10/2008 | Nagata |
| 2010/0004279 A1* | 1/2010 | Watanabe ................ A61P 7/02 514/301 |
| 2010/0160252 A1 | 6/2010 | Chetoni |
| 2013/0012439 A1 | 1/2013 | Matsumoto et al. |

FOREIGN PATENT DOCUMENTS

| CN | 102905717 B | 9/2016 | |
| JP | H05246841 A | 9/1993 | |
| JP | H09-291025 A | 11/1997 | |
| JP | H09-291026 A | 11/1997 | |
| JP | H10-059841 A | 3/1998 | |
| JP | 2002-187852 A | 7/2002 | |
| JP | 2006176461 A | 7/2006 | |
| JP | 2017-036214 A | 2/2017 | |
| RU | 2493854 C2 | 8/2006 | |
| WO | WO2006/016530 A | 2/2006 | |
| WO | WO 2009/135646 A2 | 11/2009 | |
| WO | WO-2010131486 A1 * | 11/2010 | ........... A61K 9/0043 |
| WO | WO2017/223566 A | 12/2017 | |
| WO | WO-2017223566 A1 * | 12/2017 | ........... A61K 31/485 |
| WO | WO 2018/025089 A2 | 2/2018 | |
| WO | WO-2018124062 A1 * | 7/2018 | ........... A61K 31/485 |
| WO | WO 2019/065673 A1 | 4/2019 | |

OTHER PUBLICATIONS

Ghadiri et al. (Strategies to Enhance Drug Absorption via Nasal and Pulmonary Routes, pharmaceutics, 2019), Nagata et al. (WO 2010131486 A1) (Year: 2019).*
Translated WO-2018124062-A1 (Year: 2018).*
Ali et al., Oral solid self-nanoemulsifying drug delivery systems of candesartan citexetil: formulation, characterization and in vitro drug release studies, AAPS Open, 2017. (Year: 2017).*
Morin et al., A Comparison of Granules Produced by High-Shear and Fluidized-Bed Granulation Methods, AAPS PharmSciTech, 2014. (Year: 2014).*
https://www.americanpharmaceuticalreview.com/25260-Excipients/5821902-CEOLUS-PH-Grade-Microcrystalline-Cellulose/ (Year: 2017).*
https://www.dictionary.com/browse/cohere (Year: 2025).*
International Search Report; PCT/JP2020/018456 dated Jun. 16, 2020 (3 pages).
Maggio, ET, Absorption enhancing excipients in systemic nasal drug delivery, J. Excipients and Food Chem. 5 (2) 2014, p. 100-112, Jun. 2014.
V.G. Belikov "Pharmaceutical Chemistry", textbook, 2007, Moscow, MEDpress-inform, pp. 27-29.
Gotina E.A., "Study of the properties of solutions and films based on polysaccharide compositions", Minsk, 2015 p. 70.
Tentsova A.I. et al. "Modern biopharmaceutical aspects of excipients", Pharmacy, N7, 2012, pp. 3-6 (pp. 3-4).
Philippova, O.E., "Responsive Polymer Gels", Series C, Moscow, 2000, vol. 42, 12, pp. 2328-2352.

(Continued)

*Primary Examiner* — Andrew S Rosenthal
*Assistant Examiner* — Danielle Kim
(74) *Attorney, Agent, or Firm* — Finnegan, Henderson, Farabow, Garrett & Dunner, LLP

(57) ABSTRACT

An object of the present invention is to provide a powder formulation for intranasal administration, which efficiently exhibits a medicinal effect, and the like. The object can be achieved by a powder formulation for intranasal administration comprising composite particles in which an active ingredient and a water-insoluble polysaccharide are cohered to each other.

13 Claims, 6 Drawing Sheets

(56) References Cited

OTHER PUBLICATIONS

Murashkina I.A., "Excipients in Pharmaceutical Technology", Textbook, Irkutsk, 2018, p. 64.
K.I. Kashapova, "Influence of binding substances on the technological properties of tablets", pp. 991-992.
Industrial Technology of Medicines. Vol. 2. Edited by Prof. V.I. Chueshov. Kharkov. 2002. pp. 352-355.
English translation of Russian Office Action for RU Appl. No. 2021137151, issued on Jun. 9, 2025, pp. 1-20.

\* cited by examiner

[Fig. 1]
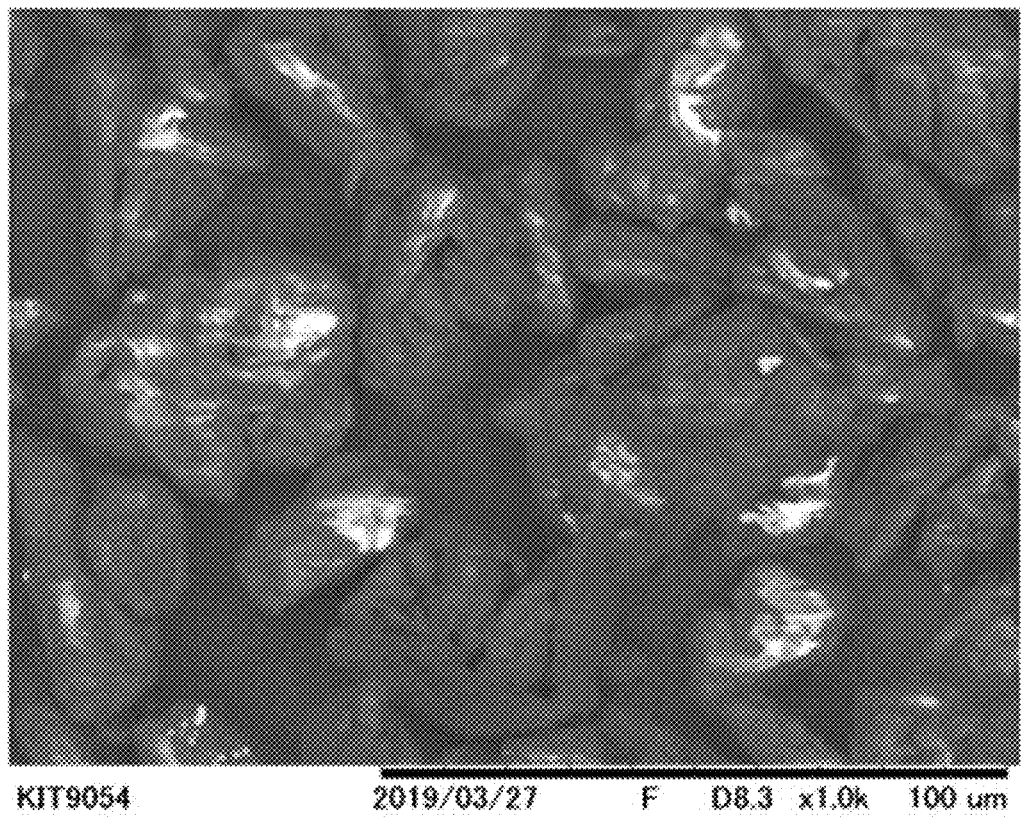

[Fig. 2]
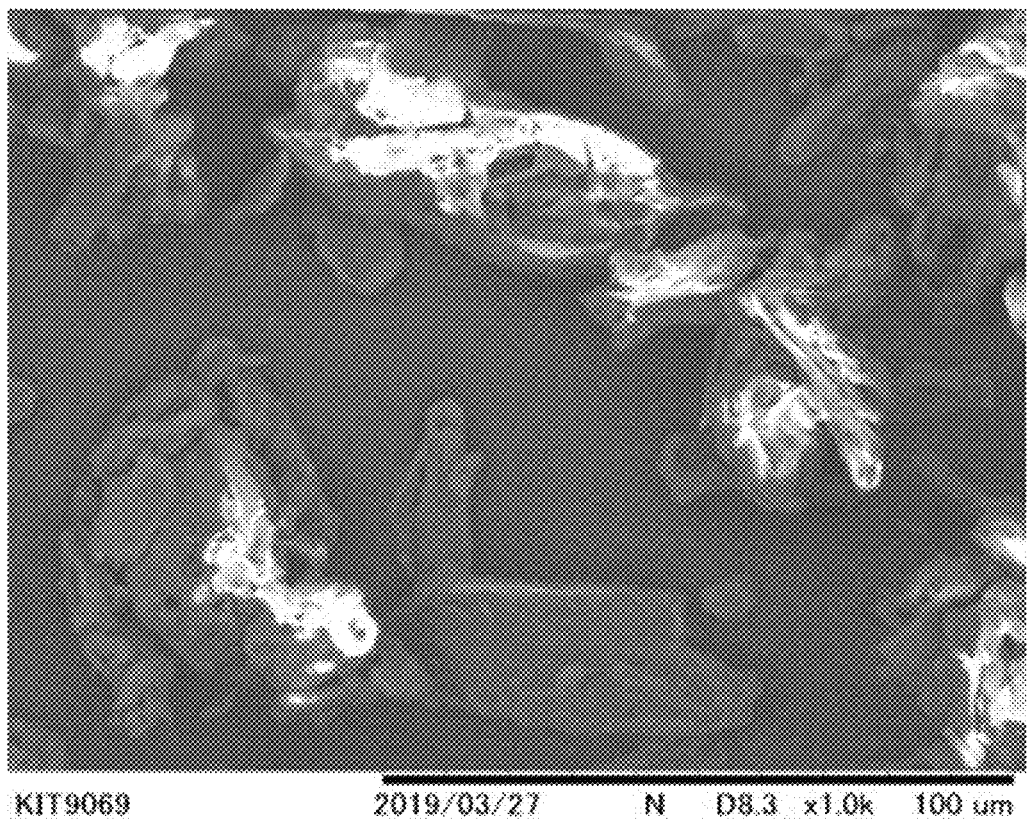

[Fig. 3]
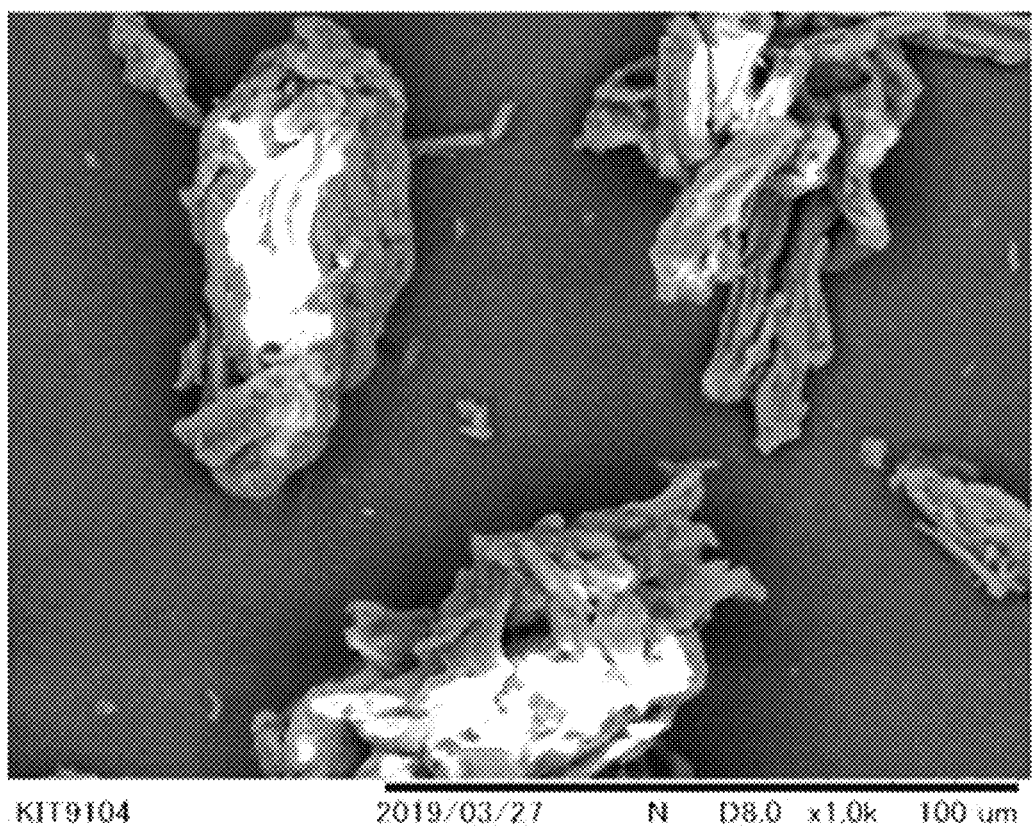

[Fig. 4]
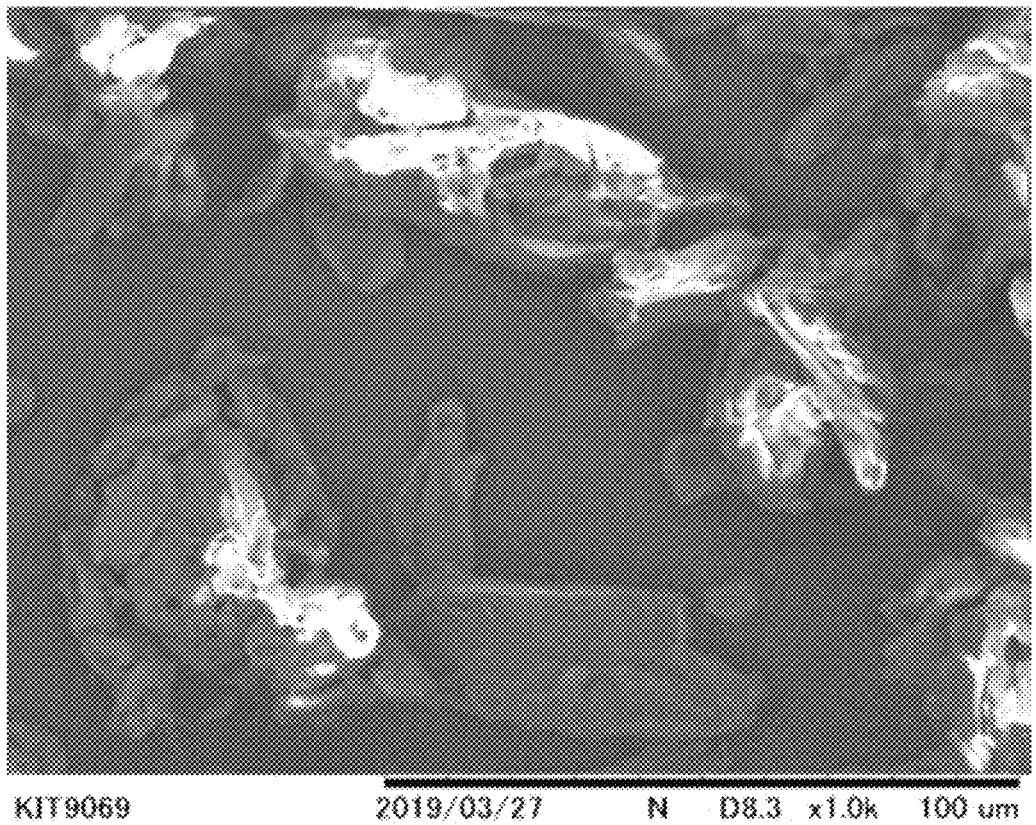

[Fig. 5]
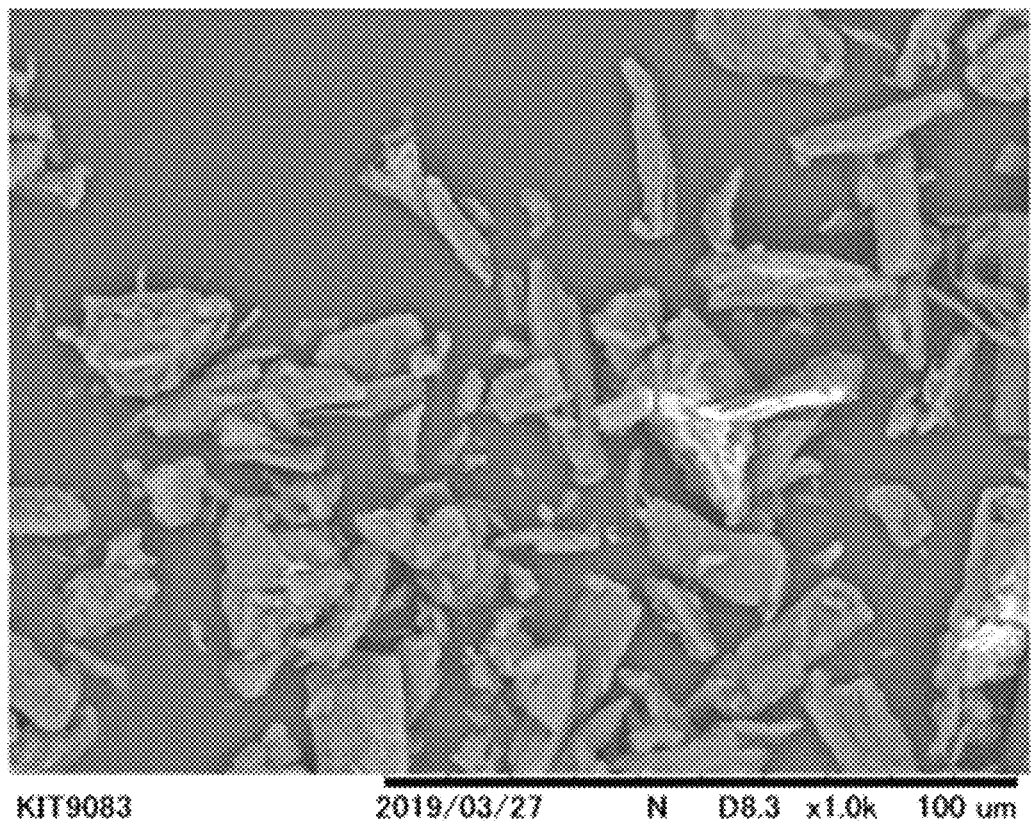

[Fig. 6]
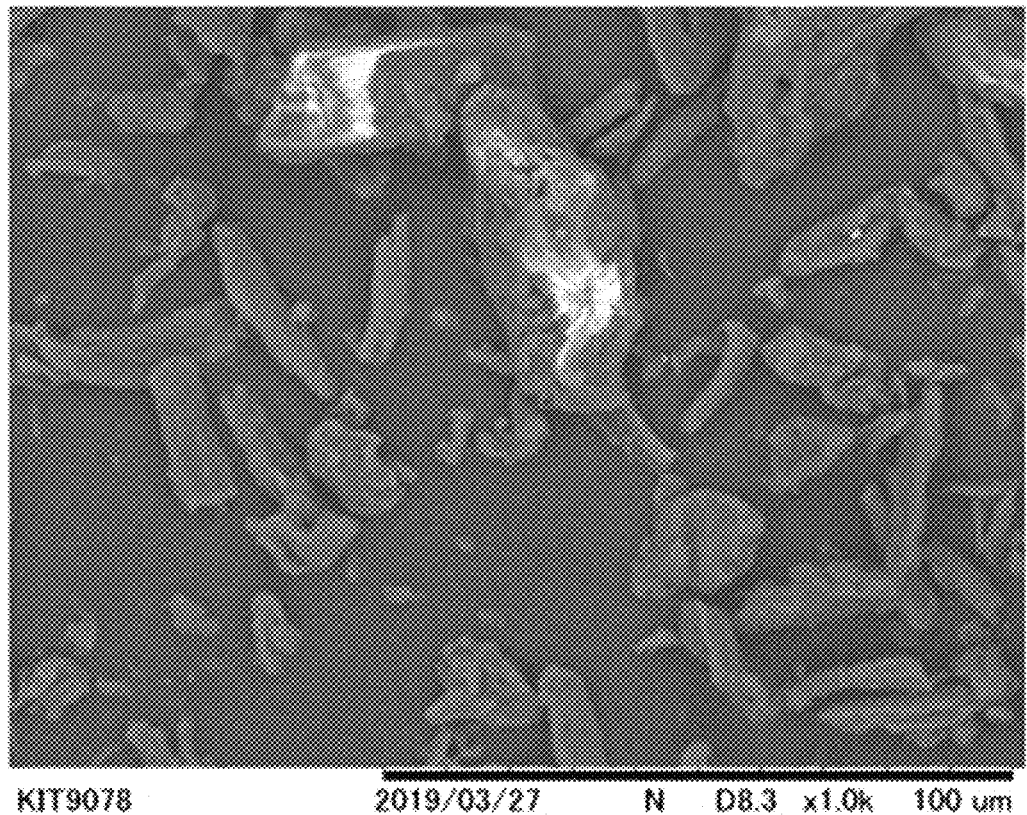

POWDER FORMULATION FOR INTRANASAL ADMINISTRATION, AND MANUFACTURING METHOD THEREOF

This is a National Stage Application under 35 U.S.C. § 371 of International Patent Application No. PCT/JP2020/018456, filed May 1, 2020, which claims the benefit of priority of Japanese Patent Application No. 2019-093150, filed May 16, 2019, both of which are incorporated herein by reference.

TECHNICAL FIELD

The present invention relates to a powder formulation for intranasal administration, and a manufacturing method thereof.

BACKGROUND ART

Conventionally, intranasal administration has been mainly aimed at local treatments such as rhinitis treatment. However, attempts have been recently made to utilize intranasal administration for preventing or treating systemic diseases, central nervous system diseases, infectious diseases, and the like, and various formulations for intranasal administration have been reported. For example, Patent Literature 1 discloses "a powdery composition for intranasal administration which contains a non-peptide/non-protein drug and a crystalline cellulose aggregate as a carrier therefor."

CITATION LIST

Patent Literature

Patent Literature 1: International Publication No. WO 2006/016530

SUMMARY OF INVENTION

Technical Problem

Patent Literature 1 discloses a method of mixing a drug and crystalline cellulose in a mortar as a method for manufacturing a powdery composition for intranasal administration. However, with this manufacturing method, the drug and crystalline cellulose may separate upon spraying the obtained composition from the administration device, and the mucoadhesive effect of the crystalline cellulose may not be fully utilized. As a result, there is a problem that the expected medicinal effect is not exhibited.

The present invention addresses the problem of providing a powder formulation for intranasal administration, which efficiently exhibits a medicinal effect, and a manufacturing method thereof.

Solution to Problem

The present inventors have found that composite particles which efficiently exhibit a medicinal effect are obtained by agitation granulation, fluidized bed granulation, or lyophilization of a mixture containing an active ingredient and a water-insoluble polysaccharide.

The present invention includes the following embodiments:

[1]
A powder formulation for intranasal administration comprising composite particles in which an active ingredient and a water-insoluble polysaccharide are cohered to each other.

[2]
The powder formulation according to [1], wherein the composite particles have an average primary particle size of 20 to 350 μm.

[3]
The powder formulation according to [1] or [2], wherein the composite particles have a specific surface area of 0.20 to 2.3 m$^2$/g.

[4]
The powder formulation according to any one of [1] to [3], wherein the composite particles have a Hausner ratio of 1.8 or less.

[5]
The powder formulation according to any one of [1] to [4], wherein the water-insoluble polysaccharide comprises crystalline cellulose.

[6]
The powder formulation according to any one of [1] to [5], wherein the composite particles further comprise a binder.

[7]
The powder formulation according to any one of [1] to [6], wherein the composite particles further comprise an absorption enhancer.

[8]
The powder formulation according to [7], wherein the absorption enhancer is hydroxypropyl-β-cyclodextrin, sodium lauryl sulfate or n-dodecyl-β-D-maltoside.

[9]
A method for manufacturing a powder formulation for intranasal administration comprising:
a step of granulating by agitation a mixture comprising an active ingredient and a water-insoluble polysaccharide to form composite particles in which the active ingredient and the water-insoluble polysaccharide are cohered to each other.

[10]
A method for manufacturing a powder formulation for intranasal administration comprising:
a step of granulating in a fluidized bed a mixture comprising an active ingredient and a water-insoluble polysaccharide to form composite particles in which the active ingredient and the water-insoluble polysaccharide are cohered to each other.

[11]
A method for manufacturing a powder formulation for intranasal administration comprising:
a step of lyophilizing a mixture comprising an active ingredient and a water-insoluble polysaccharide to form composite particles in which the active ingredient and the water-insoluble polysaccharide are cohered to each other.

[12]
The manufacturing method according to any one of [9] to [11], wherein the water-insoluble polysaccharide comprises crystalline cellulose.

[13]
The manufacturing method according to any one of [9] to [12], wherein the mixture further comprises a binder.

[14]

The manufacturing method according to any one of [9] to [13], wherein the mixture further comprises an absorption enhancer.

[15]

The manufacturing method according to [14], wherein the absorption enhancer is hydroxypropyl-β-cyclodextrin, sodium lauryl sulfate or n-dodecyl-β-D-maltoside.

Advantageous Effects of Invention

According to the present invention, it is possible to provide a powder formulation for intranasal administration, which efficiently exhibits a medicinal effect, and a manufacturing method thereof.

BRIEF DESCRIPTION OF DRAWINGS

FIG. 1 shows an electron micrograph of the test formulation of Example 7.

FIG. 2 shows an electron micrograph of the test formulation of Example 10.

FIG. 3 shows an electron micrograph of the test formulation of Example 15.

FIG. 4 shows an electron micrograph of the test formulation of Example 16.

FIG. 5 shows an electron micrograph of the test formulation of Comparative Example 1.

FIG. 6 shows an electron micrograph of the test formulation of Comparative Example 2.

DESCRIPTION OF EMBODIMENTS

<Powder Formulation>

One embodiment of the present invention relates to a powder formulation for intranasal administration comprising composite particles in which an active ingredient and a water-insoluble polysaccharide are cohered to each other.

The "composite particles" in the present description are particles (aggregates) formed by an active ingredient and a water-insoluble polysaccharide adhering to each other. Therefore, the "composite particles" in the present description are clearly distinguished from a simple mixture of a drug and crystalline cellulose as disclosed in Patent Literature 1, for example.

In the present embodiment, an active ingredient and a water-insoluble polysaccharide form composite particles, and therefore the active ingredient and the water-insoluble polysaccharide adhere together to the nasal mucosa when the powder formulation is administered into the nasal cavity. Since the water-insoluble polysaccharide has a mucoadhesive effect, the active ingredient adheres to the nasal mucosa by this effect, and the medicinal effect of the active ingredient is efficiently exhibited.

When the active ingredient and the water-insoluble polysaccharide are simply mixed, the active ingredient may not be mixed uniformly, and the amount of the active ingredient may vary between powder formulations. By contrast, in the present embodiment, the active ingredient and the water-insoluble polysaccharide form composite particles, and therefore such variation can be reduced.

In the present embodiment, since the active ingredient and the water-insoluble polysaccharide form composite particles, the fluidity of the powder formulation is improved. As a result, the powder formulation can be uniformly and easily filled in a container, and the spray discharge percentage of the powder formulation discharged from the administration device is improved.

When a powder formulation containing particles of a small particle size is administered into the nasal cavity, it may pass through the nasal cavity and reach the lungs. However, in the present embodiment, the active ingredient and the water-insoluble polysaccharide form composite particles, which increases the particle size, and therefore allows to limit the passing through the nasal cavity.

The composite particles of the present embodiment are formed by the components of the composite particles which are cohered to each other, and therefore have a particle size larger than that of each component.

Examples of the lower limit of the average primary particle size of the composite particles of the present embodiment include 20 μm, 25 μm, 30 μm, 35 μm, and 40 μm, and examples of the upper limit include 350 μm, 300 μm, 250 μm, 200 μm, 150 μm and 100 μm. A specific range can be defined by appropriately combining the lower limits and the upper limits. For example, the range can be set to 20 to 350 μm, 25 to 300 μm, 30 to 250 μm, 35 to 200 μm, or 40 to 150 μm. The average primary particle size is measured according to the method described in the examples below.

Note that since the average primary particle size is measured under a dispersive pressure of 2 bar, the composite particles will come apart into each component by the dispersive pressure if the components of the composite particles are not cohered to each other. For example, in the case of a simple mixture of a drug and crystalline cellulose as disclosed in Patent Literature 1, even if some of the components get together and form large particles, these particles will come apart under the measurement conditions for the average primary particle size, which will therefore be significantly different from the average primary particle size of the composite particles of the present embodiment.

Examples of the lower limit of the specific surface area of the composite particles of the present embodiment include 0.10 $m^2/g$, 0.15 $m^2/g$, 0.20 $m^2/g$, 0.25 $m^2/g$, and 0.30 $m^2/g$, and examples of the upper limit include 2.3 $m^2/g$, 2.0 $m^2/g$, 1.8 $m^2/g$, 1.6 $m^2/g$, and 1.4 $m^2/g$. A specific range can be defined by appropriately combining the lower limits and the upper limits. For example, the range can be set to 0.10 to 2.3 $m^2/g$, 0.15 to 2.0 $m^2/g$, 0.20 to 1.8 $m^2/g$, 0.25 to 1.6 $m^2/g$, or 0.30 to 1.4 $m^2/g$. The specific surface area is measured according to the method described in the examples below.

Examples of the upper limit of the Hausner ratio of the composite particles of the present embodiment include 1.8, 1.7, 1.6, 1.5, 1.4, 1.3, and 1.2, and the lower limit is not particularly limited. The Hausner ratio is measured according to the method described in the examples below.

The Japanese Pharmacopoeia 17th Edition describes the relationship between the Hausner ratio and fluidity as follows.

Hausner Ratio: Degree of Fluidity
    1.00 to 1.11: Very good
    1.12 to 1.18: Good
    1.19 to 1.25: Slightly good
    1.26 to 1.34: Average
    1.35 to 1.45: Slightly poor
    1.46 to 1.59: Poor
    >1.60: Very poor Examples of the diseases to be diagnosed, prevented or treated by the powder formulation of the present embodiment include cerebral hemorrhage, cerebral infarction, central nervous system infection, brain tumor, Parkinson's disease, epilepsy, amyotrophic lateral sclerosis, Alzheimer's disease, Levy body dementia, progressive supranuclear palsy, corticobasal degeneration, Pick's disease, frontotemporal dementia, multiple sclerosis, schizophrenia, depression, bipolar disorder, dysthymia, adjustment disorder, social anxiety disorder, panic disorder, obsessive-compulsive disorder, autism spectrum disorder, attention-deficit hyperactivity disorder, sleep disorder, insomnia, traumatic brain injury, pain, migraine, headache, pyretolysis, inflammation, rheumatoid arthritis, epilepsy, cerebral circulatory and metabolic disease, hypomyotonia, autonomic neuropathy, dizziness, hypertension, angina, arrhythmia, allergies, bronchodilation/asthma, other respiratory diseases (antitussive, expectorant, etc.), peptic ulcer, other gastrointestinal diseases (antidiarrheal, intestinal regulation, stomachic, digestion promotion, catharsis, etc.), gout/hyperuricemia, dyslipidemia, diabetes, hormone-related diseases (diseases related to pituitary hormone, adrenocortical hormone, sex hormone, and other hormones), uterus-related diseases, osteoporosis/metabolic bone disease, vitamin deficiency, nutritional deficiency, intoxication (including detoxification), cancer, hyperactive immunity, ear, nose and throat-related diseases, oral diseases, genitourinary diseases, hemorrhoid, dermatological diseases, hematopoietic/blood clotting diseases, drug addiction, anesthesia, and lifestyle-related diseases.

One active ingredient of the present embodiment may be used alone, or a plurality of active ingredients may be used in combination. Examples of the active ingredient include a low molecular weight compound, a middle molecule drug (for example, a peptide drug), a protein medicament (for example, an antibody drug), a nucleic acid medicine, a cell medicament, regenerative medicine, and a vaccine antigen (for example, a peptide antigen).

More specific examples of the active ingredient include tissue plasminogen activator, edaravone, ozagrel sodium, a selective thrombin inhibitor, vidarabine, aciclovir, ganciclovir, valganciclovir, zidovudine, didanosine, zalcitabine, nevirapine, delavirdine, saquinavir, ritonavir, indinavir, nelfinavir, vancomycin, ceftazidime, ampicillin, panipenem/betamipron, dexamethasone, cisplatin, carboplatin, vincristine, cyclophosphamide, ifosfamide, temozolomide, etoposide, L-dopa, carbidopa, benserazide, entacapone, adrenalin, amphetamine, apomorphine, amantadine, cabergoline, zonisamide, droxidopa, piperidene, phenobarbital, phenytoin, primidone, ethosuximide, zonisamide, clonazepam, midazolam, remimazolam, flumazenil, sodium valproate, carbamazepine, gabapentin, topiramate, cannabide, donepezil, rivastigmine, galantamine, memantine, dimethyl fumarate, natalizumab, haloperidol, spiperone, fluphenazine, chlorpromazine, risperidone, blonanserin, quetiapine, olanzapine, aripiprazole, brexpiprazole, triazolam, zopiclone, zolpidem, etizolam, lormetazepam, bromovalerylurea, chloral hydrate, pentobarbital, rilmazafone, oxytocin, vasopressin, desmopressin, granisetron, ondansetron, tropisetron, palonosetron, indisetron, triazolam, melatonin, levetiracetam, cannabinoid, clonazepam, diazepam, nitrazepam, zolpidem, donepezil, memantine, tiapride, cefaclor, enoxacin, aciclovir, zidovudine, didanosine, nevirapine, indinavir, dantrolene, digoxin, trihexyphenidyl, piperidene, dextromethorphan, naloxone, betahistine, naphazoline, diltiazem, tranilast, loperamide, beclometasone, chlorpheniramine, sildenafil, tadalafil, vardenafil, cyanocobalamin, finasteride, epinephrine, oxybutynin, propiverine, solifenacin, tolterodine, imidafenacin, fesoterodine, mirabegron, tamsulosin, silodosin, 5-FU, telaprevir, ribavirin, simeprevir, guanfacine, methylphenidate, atomoxetine, progesterone, sumatriptan, zolmitriptan, dihydroergotamine, rizatriptan, camostat, nafamostat, erenumab, galcanezumab, fremanezumab, fomivirsen, mipomersen, nusinersen, ciclosporin, tacrolimus, fluorodeoxyglucose, fluorothymidin, iopamidol, thallium, manganese, technetium, insulin, growth hormones, growth hormone-releasing peptides, ghrelin, glucagon, calcitonin, interferons, erythropoietin, interleukins, PTH(1-84), PTH(1-34), PTH-related peptides, GLP-1, vasopressin, leuprorelin, granulocyte colony stimulating factor, prolactin, pituitary gonadotropic hormone, chorionic gonadotropin Snb12600, follicle-stimulating hormone, luteinizing hormone, leptin, nerve growth factors (NGF), stem cell growth factors (SCGF), keratinocyte growth factor (KGF), low-molecular-weight heparin, tacrolimus, allergen extract powder, human antibodies (for example, adalimumab, panitumumab, golimumab, canakinumab, ofatumumab, denosumab, ipilimumab, belimumab, raxibacumab, ramucirumab, nivolumab, secukinumab, evolocumab, alirocumab, necitumumab, nivolumab, and pembrolizumab), chimeric antibodies (for example, abciximab), humanized antibodies (for example, bevacizumab) and mouse antibodies (for example, blinatumomab).

More specific examples of the active ingredient include vaccine antigens against the following viruses or pathogens:

Adenovirus, AIDS virus, baculovirus, HCMV (human cytomegalovirus), hemorrhagic fever virus, hepatitis virus, herpes B virus, immunodeficiency virus, human immunodeficiency virus, human T-cell leukemia virus, neonatal gastroenteritis virus, infectious hematopoietic necrosis virus, infectious pancreatic necrosis virus, influenza virus, Japanese encephalitis virus, leukemia virus, mumps virus, orthomyxovirus, pneumonia virus, poliovirus, polydnavirus, rotavirus, SARS virus, vaccinia virus, RS virus, *Shigella* species, *Salmonella* typhosa, tubercle *bacillus*, tetanus *bacillus*, diphtheria *bacillus*, meningococcus, *Bordetella pertussis*, *Streptococcus pneumoniae*, anthrax *bacillus*, *bacillus* botulinus, *Clostridium difficile*, *Clostridium welchii*, *Enterococcus faecalis*, *Enterococcus faecium*, hemophilus influenza, *Helicobacter pylori* bacteria, *Mycobacterium leprae*, gonococcus, meningococcus, *Salmonella* typhosa, *Staphylococcus aureus*, *Treponema pallidum*, cholera *bacillus*, and *falciparum* malaria parasite.

The "water-insoluble polysaccharide" in the present description means a polysaccharide which dissolves at 0.001 g or less in 1000 ml of water (20° C.). One water-insoluble polysaccharide may be used alone, or a plurality of water-insoluble polysaccharides may be used in combination.

Examples of the water-insoluble polysaccharide include cellulose, hemicellulose, chitosan, and chitin, preferably cellulose or hemicellulose, more preferably cellulose, and particularly preferably crystalline cellulose. By using crystalline cellulose, the fluidity of the powder formulation can be further improved. Examples of commercially available crystalline cellulose include PH grades of CEOLUS (Registered trademark), and PH grades of AVICEL (Registered trademark), and more specifically, CEOLUS (Registered trademark) PH-F20JP, AVICEL (Registered trademark) PH-105 and CEOLUS (Registered trademark) PH-UF702.

The composite particles of the present embodiment may further contain a binder. When the composite particles contain a binder, the adhesive strength between the active ingredient and the water-insoluble polysaccharide can be increased, and the primary particle size and disintegration property of the composite particles can be adjusted. One binder may be used alone, or a plurality of binders may be used in combination.

Examples of the binder include purified water, hydroxypropyl methylcellulose (HPMC), hydroxypropyl cellulose (HPC), methyl cellulose, carboxymethyl cellulose, pregelatinized starch, partially pregelatinized starch, and the salts thereof, and preferably hydroxypropyl methylcellulose or pregelatinized starch.

The composite particles of the present embodiment may further contain an additive. Examples of the additive include an absorption enhancer, a dissolution aid/solubilizer, a stabilizer, a fluidizer, a disintegrant, a masking agent, a flavoring agent, a preservative, and an immunostimulator.

Examples of the absorption enhancer include a surfactant, a chelating agent, a cyclodextrin, and a transmembrane peptide. Examples of the surfactant include an anionic surfactant such as sodium lauryl sulfate and sodium caprate, a nonionic surfactant such as n-dodecyl-β-D-maltoside and tetradodecyl-β-D-maltoside, and an amphoteric surfactant such as dipalmitoyl phosphatidylcholine and sodium taurocholate. Examples of the chelating agent include EDTA, a citrate and a pyrophosphate. Examples of the cyclodextrin include β-cyclodextrin, 2-hydroxypropyl-β-cyclodextrin, and methyl-β-cyclodextrin. Examples of the transmembrane peptide include penetratin, HIV-1 Tat, HIV-1 Rev, arginine octamer, arginine dodecamer, pVEC, Ems, RRL helix, and PRL4.

Examples of the dissolution aid/solubilizer include a cyclodextrin, capric acid, lecithin, dipalmitoyl-glycerophosphatidylcholin, dodecyl maltoside, dodecyl phosphocholine, and polyethylene glycol.

Examples of the stabilizer include a disaccharide (for example, sucrose, lactulose, lactose, maltose, trehalose, cellobiose, xylobiose, maltulose, galactosucrose, and derivatives thereof), a vitamin (for example, ascorbic acid, and tocopherol), an amino acid (for example, glycine), a citrate, and a pyrophosphate.

Examples of the fluidizer include crystalline cellulose and tricalcium phosphate.

Examples of the disintegrant include cellulose, starch and crospovidone.

Examples of the masking agent include mannitol.

Examples of the flavoring agent include aspartame and menthol.

Examples of the preservative include thimerosal.

Examples of the immunostimulator include a cyclodextrin, an aluminum salt, and a CpG oligonucleotide.

<Manufacture of Powder Formulation>

One embodiment of the present invention relates to a method for manufacturing a powder formulation for intranasal administration comprising a step of granulating by agitation, granulating in a fluidized bed, or lyophilizing a mixture comprising an active ingredient and a water-insoluble polysaccharide to form composite particles in which the active ingredient and the water-insoluble polysaccharide are cohered to each other. Hereinafter, the method by agitation granulation, the method by fluidized bed granulation, and the method by lyophilization are referred to as "agitation granulation method", "fluidized bed granulation method", and "lyophilization method", respectively. The components of the composite particles are as described in the above section <Powder Formulation>.

The fluid volume of the binder added in the agitation granulation method is preferably 5 mL to 150 mL, more preferably 15 mL to 100 mL, and still more preferably 20 mL to 75 mL per 100 g of total weight of powder in the granulation tank. By granulating by agitation with such added fluid volume of binder, composite particles having preferable properties can be obtained.

The spray rate of the binder in the fluidized bed granulation method is preferably 0.001 g/min to 0.4 g/min, more preferably 0.005 g/min to 0.3 g/min, and still more preferably 0.01 g/min to 0.25 g/min per 50 g of total weight of powder in the granulation tank. The total amount added as the binder in the fluidized bed granulation method is preferably 0.01 g to 4.0 g, more preferably 0.05 g to 3.0 g, and still more preferably 0.1 g to 2.5 g per 50 g of total weight of powder in the granulation tank. By granulating in a fluidized bed in such conditions, composite particles having preferable properties can be obtained.

The freezing temperature in the lyophilization method is preferably −100° C. to −10° C., more preferably −80° C. to −15° C., and still more preferably −60° C. to −20° C. By lyophilizing at such temperatures, composite particles having preferable properties can be obtained.

EXAMPLES

Hereinafter, the present invention will be described in more details using examples and comparative examples, but the technical scope of the present invention is not limited thereto.

<Materials>
(Active Ingredient)
  Levodopa (Cayman Chemical Company)
  Indomethacin (Wako Pure Chemical Industries, Ltd.)
  Testosterone (Wako Pure Chemical Industries, Ltd.)
  Zolmitriptan (Tokyo Chemical Industry Co., Ltd.)
  Ibuprofen (Wako Pure Chemical Industries, Ltd.)
(Water-Insoluble Polysaccharide)
  Crystalline Cellulose (Ceolus (Registered trademark) PH-F20JP, Asahi Kasei Chemicals Corporation)
(Binder)
  Hydroxypropyl Cellulose (HPC-H, Nippon Soda Co., Ltd.)
  Hydroxypropyl Methylcellulose (HPMC TC-5E, Shin-Etsu Chemical Co., Ltd.)
  Pregelatinized Starch (Asahi Kasei Chemicals Corporation)
(Additive)
  Hydroxypropyl-β-cyclodextrin (Wako Pure Chemical Industries, Ltd.)
  Ascorbic acid (Wako Pure Chemical Industries, Ltd.)
  Trehalose (HAYASHIBARA CO., LTD.)
  Crystalline Cellulose (Ceolus (Registered trademark) PH-301, Asahi Kasei Chemicals Corporation)
  Tricalcium Phosphate (ICL Performance Products LP)
  Sodium Lauryl Sulfate (Wako Pure Chemical Industries, Ltd.)
  n-dodecyl-β-D-maltoside (Wako Pure Chemical Industries, Ltd.)

<Manufacturing Method>
(Agitation Granulation Method)

An active ingredient, a water-insoluble polysaccharide and an additive were charged into the granulation tank of an agitation granulator (High Speed Mixer FS-GS-5, Fukae Powtech Co., Ltd.), and the powder in the granulation tank was mixed by agitation under the stirring conditions of an agitator rotation speed of 400 rpm and a chopper rotation speed of 1500 rpm. Then, the mixture was mixed by agitation under the same stirring conditions for about 6 to 8 minutes, while adding the binder dropwise to the granulation tank. The mixture removed from the granulation tank was dried at 50° C. for 2 hours or more in a shelf-type dryer (NO607C, IWAKURO Mfg. Co. Ltd). The obtained dry mixture was passed through 32 μm and 180 μm sieves (JIS Z 8801, SIEVE FACTORY Iida Co., Ltd.), and the dry mixture remaining on the 32 μm sieve was used as a test formulation.

(Fluidized Bed Granulation Method)

An active ingredient, a water-insoluble polysaccharide, and an additive were charged into the chamber of a fluidized bed granulator (FL-LABO, Freund Corp.), and the powder in the chamber was fluidized and mixed with air at 70° C. Then, fluidized mixing was performed while the binder dissolved in purified water was sprayed into the chamber at a spray rate of 3.6 g (as the amount of binding solution)/min for 10 minutes. The dry mixture removed from the chamber was passed through 32 μm and 180 μm sieves (JIS Z 8801, SIEVE FACTORY Iida Co., LTD.), and the dry mixture remaining on the 32 μm sieve was used as a test formulation.

(Lyophilization Method)

Ultrapure water was placed in a 200 mL aluminum tray beforehand, and the inner bottom of the aluminum tray was frozen at −20° C., then an active ingredient, a water-insoluble polysaccharide, a binder, and an additive were mixed with a phosphate buffer, and placed in the aluminum tray. The mixture was pre-frozen at −20° C. for 2 hours and placed in a shelf-type freeze dryer (FreeZone Triad Freeze Dry System, Labconco Corp.) to obtain a freeze-dried product under the following conditions. As the lyophilization conditions, a primary drying was carried out at −25° C. for 30 hours, and a secondary drying was further carried out at 30° C. for 37 hours under a reduced pressure of 105 mTorr. The prepared freeze-dried product was ground with a glass mortar and used as a test formulation.

(Mortar Mixing Method)

Crystalline cellulose was added to a glass mortar and grinded, and excess crystalline cellulose was removed. An active ingredient, a water-insoluble polysaccharide, and an additive were added to this glass mortar and mixed for 10 minutes using a glass pestle, and this was used as a test formulation.

Details of each Example and Comparative Example are shown in Table 1.

TABLE 1

Composition and Manufacturing Method of Test Formulation

| | Active Ingredient (Amount added, g) | Water-Insoluble Polysaccharide (Amount added, g) | Binder (Amount added) | Additive (Amount added, g) | Manufacturing Method |
|---|---|---|---|---|---|
| Example 1 | Levodopa (150.0) | Crystalline Cellulose (150.0) | Purified Water (100 ml) | — | Agitation Granulation |
| Example 2 | Levodopa (150.0) | Crystalline Cellulose (150.0) | Purified Water (100 ml) HPMC (2.9 g) | — | Agitation Granulation |
| Example 3 | Levodopa (150.0) | Crystalline Cellulose (142.5) | Purified Water (100 ml) HPMC (2.9 g) | Cyclodextrin (7.5 g) | Agitation Granulation |
| Example 4 | Levodopa (150.0) | Crystalline Cellulose (142.5) | Purified Water (100 ml) HPMC (2.9 g) | Ascorbic Acid (7.5 g) | Agitation Granulation |
| Example 5 | Levodopa (150.0) | Crystalline Cellulose (150.0) | Purified Water (125 ml) HPMC (3.6 g) | — | Agitation Granulation |
| Example 6 | Levodopa (30.0) | Crystalline Cellulose (270.0) | Purified Water (150 ml) HPMC (2.9 g) | — | Agitation Granulation |
| Example 7 | Levodopa (3.0) | Crystalline Cellulose (297.0) | Purified Water (150 ml) HPMC (2.9 g) | — | Agitation Granulation |
| Example 8 | Levodopa (30.0) | Crystalline Cellulose (270.0) | Purified Water (150 ml) HPC (2.9 g) | — | Agitation Granulation |
| Example 9 | Levodopa (30.0) | Crystalline Cellulose (270.0) | Purified Water (200 ml) Pregelatinized Starch (2.9 g) | — | Agitation Granulation |
| Example 10 | Indomethacin (3.0) | Crystalline Cellulose (297.0) | Purified Water (200 ml) HPMC (2.9 g) | — | Agitation Granulation |
| Example 11 | Indomethacin (2.0) | Crystalline Cellulose (298.0) | Purified Water (250 ml) Pregelatinized Starch (0.5 g) | — | Agitation Granulation |
| Example 12 | Indomethacin (2.0) | Crystalline Cellulose (296.0) | Purified Water (250 ml) Pregelatinized Starch (0.5 g) | Cyclodextrin (2.0 g) | Agitation Granulation |
| Example 13 | Zolmitriptan (3.0) | Crystalline Cellulose (297.0) | Purified Water (200 ml) HPMC (2.9 g) | — | Agitation Granulation |
| Example 14 | Ibuprofen (3.0) | Crystalline Cellulose (297.0) | Purified Water (200 ml) HPMC (2.9 g) | — | Agitation Granulation |
| Example 15 | Levodopa (0.5) | Crystalline Cellulose (49.5) | Purified Water (33.9 ml) HPMC (2.1 g) | — | Fluidized Bed Granulation |
| Example 16 | Indomethacin (0.5) | Crystalline Cellulose (49.5) | Purified Water (33.9 ml) HPMC (2.1 g) | — | Fluidized Bed Granulation |
| Example 17 | Indomethacin (1.0) | Crystalline Cellulose (49.0) | Purified Water (71 ml) Pregelatinized Starch (1.0 g) | — | Fluidized Bed Granulation |
| Example 18 | Testosterone (0.5) | Crystalline Cellulose (49.5) | Purified Water (33.9 ml) HPMC (2.1 g) | — | Fluidized Bed Granulation |
| Example 19 | Ibuprofen (0.5) | Crystalline Cellulose (49.5) | Purified Water (33.9 ml) HPMC (2.1 g) | — | Fluidized Bed Granulation |
| Example 20 | Levodopa (1.0) | Crystalline Cellulose (24.5) | — | Trehalose (24.5 g) | Lyophilization |
| Example 21 | Levodopa (0.5) | Crystalline Cellulose (49.5) | HPMC (2.9 g) | — | Lyophilization |
| Example 22 | Levodopa (59.4) | Crystalline Cellulose (178.2) | Purified Water (110 ml) | Sodium Lauryl Sulfate (2.4 g) | Agitation Granulation |

TABLE 1-continued

Composition and Manufacturing Method of Test Formulation

| | Composition | | | | |
|---|---|---|---|---|---|
| | Active Ingredient (Amount added, g) | Water-Insoluble Polysaccharide (Amount added, g) | Binder (Amount added) | Additive (Amount added, g) | Manufacturing Method |
| Example 23 | Levodopa (49.5) | Crystalline Cellulose (148.5) | Purified Water (110 ml) | n-Dodecyl-β-D-maltoside (2.0 g) | Agitation Granulation |
| Comparative Example 1 | Levodopa (0.5) | Crystalline Cellulose (49.5) | — | — | Mortar Mixing |
| Comparative Example 2 | Levodopa (0.5) | Crystalline Cellulose (44.1) | — | Crystalline Cellulose (5.0 g) Calcium Phosphate (0.4 g) | Mortar Mixing |

HPMC: Hydroxypropyl Methylcellulose
HPC: Hydroxypropyl Cellulose
Calcium Phosphate: Tricalcium Phosphate <Observation by Electron Microscope>

The test formulations were set in an electron microscope (Miniscope TM3000, Hitachi High-Tech Corporation) and observed after depressurization using a vacuum pump. FIGS. 1 to 6 show the electron micrographs of the test formulations of Examples 7, 10, 15 and 16 and Comparative Examples 1 and 2, respectively. In the test formulations of the Examples, unlike the test formulations of the Comparative Examples, a state in which the various components were aggregated to form composite particles was observed.

<Measurement of Average Primary Particle Size>

The average primary particle sizes of the test formulations were measured under a dispersive pressure of 2 bar by connecting a dry automatic dispersion unit (Scirocco 2000, Malvern) to a particle size distribution analyzer based on laser diffraction (Mastersizer 2000, Malvern). Table 2 shows the results of the average primary particle sizes calculated based on the particle size distribution analysis by volume conversion. The average primary particle sizes of the test formulations of the Examples were significantly larger than that of the test formulations of the Comparative Examples, which indicates that the various components are forming composite particles.

<Average Content and Content Uniformity>

(Levodopa-Containing Test Formulation)

The measurement was performed by reverse phase chromatography. Specifically, pH 2.8 acetonitrile/0.05% trifluoroacetic acid (5/95) was used as the mobile phase, and the test formulation was diluted with the mobile phase to an appropriate concentration. Then, the filtrate filtered with a 0.45 μm syringe filter was measured by high performance liquid chromatography (LC-2010 or LC-2030C 3D plus, Shimadzu Corporation) to calculate the levodopa content in the test formulation. This operation was performed three times for each test formulation, and the average value and the relative standard deviation of the measured levodopa contents with respect to the theoretical levodopa content contained in the test formulation used for the measurement were calculated to obtain the content (%) and content uniformity (%), respectively.

(Indomethacin-Containing Test Formulation)

The measurement was performed by reverse phase chromatography. Specifically, methanol/0.1% phosphoric acid (28/12) was used as the mobile phase, and the test formulation was diluted with the mobile phase to an appropriate concentration. Then, the filtrate filtered with a 0.45 μm syringe filter was measured by high performance liquid chromatography (LC-2030C 3D plus, Shimadzu Corporation) to calculate the indomethacin content in the test formulation. This operation was performed three times for each test formulation, and the average value and the relative standard deviation of the measured indomethacin contents with respect to the theoretical indomethacin content contained in the test formulation used for the measurement were calculated to obtain the content (%) and content uniformity (%), respectively.

The results are shown in Table 2. These results indicate that the various components are uniformly contained in the composite particles of the Examples.

TABLE 2

Average Particle Size, Content and Content Uniformity of Test Formulation

| | Average Particle Size (μm) | Content (%) | Content Uniformity (%) |
|---|---|---|---|
| Example 1 | 42.9 | 100.8 | 2.6 |
| Example 2 | 36.0 | 98.2 | 5.6 |
| Example 3 | 42.6 | 101.6 | 0.2 |
| Example 4 | 40.6 | 102.2 | 5.2 |
| Example 5 | 55.6 | — | — |
| Example 6 | 31.6 | 90.4 | 3.5 |
| Example 7 | 37.7 | 102.6 | 5.2 |
| Example 8 | 31.6 | 107.1 | 1.8 |
| Example 9 | 32.8 | 96.9 | 1.5 |
| Example 10 | 34.2 | 103.3 | 3.2 |
| Example 11 | 124.1 | 97.8 | 3.2 |
| Example 12 | 120.6 | 96.3 | 3.3 |
| Example 13 | 35.4 | — | — |
| Example 14 | 37.1 | — | — |
| Example 15 | 45.6 | 104.6 | 2.7 |
| Example 16 | 35.9 | 92.6 | 1.0 |
| Example 17 | 41.6 | 83.9 | 0.7 |
| Example 18 | 37.6 | — | — |
| Example 19 | 43.2 | — | — |
| Example 20 | 34.8 | 96.3 | 2.0 |
| Example 21 | 35.8 | 98.7 | 0.2 |
| Example 22 | 34.7 | 110.2 | 0.7 |
| Example 23 | 34.1 | 99.2 | 0.7 |
| Comparative Example 1 | 16.2 | 103.3 | 1.9 |
| Comparative Example 2 | 17.6 | 102.4 | 1.1 |

<Measurement of Specific Surface Area>

A test formulation was dried under suction and reduced pressure at 100° C. for 1 hour, and then the specific surface area was measured by the BET method using an instrument for measuring the specific surface area based on gas adsorption using nitrogen gas (Autosorb-iQ-MP, Quantachrome). The results are shown in Table 3. The specific surface areas of the test formulations of the Examples were significantly smaller than that of the test formulations of the Comparative Examples, which indicates that the various components are forming composite particles.

TABLE 3

Specific Surface Area of Test Formulation

| | Specific Surface Area (m²/g) |
|---|---|
| Example 1 | 0.453 |
| Example 2 | 0.521 |
| Example 3 | 0.582 |
| Example 4 | 0.302 |
| Example 5 | 0.483 |
| Example 6 | 1.218 |
| Example 7 | 0.753 |
| Example 8 | 1.069 |
| Example 9 | 0.668 |
| Example 10 | 0.550 |
| Example 11 | 0.213 |
| Example 12 | 0.335 |
| Example 13 | 0.956 |
| Example 14 | 0.809 |
| Example 15 | 0.772 |
| Example 16 | 1.221 |
| Example 17 | 1.019 |
| Example 18 | 0.971 |
| Example 19 | 0.718 |
| Example 20 | 0.674 |
| Example 21 | 1.368 |
| Example 22 | 0.946 |
| Example 23 | 0.853 |
| Comparative Example 1 | 2.391 |
| Comparative Example 2 | 2.388 |

<Measurement of Hausner Ratio>

Based on the method for measuring the physical properties of powders in the Japanese Pharmacopoeia's General Test Methods, a test formulation having a known mass was placed in a measuring cylinder, the volume thereof was measured, and the mass was divided by the volume to calculate the bulk density.

Based on the method for measuring the physical properties of powders in the Japanese Pharmacopoeia's General Test Methods, a test formulation having a known mass was placed in a measuring cylinder, and then the measuring cylinder was tapped. The volume at which no change in the volume of the test formulation was observed was measured, and the mass was divided by the volume to calculate the tap density.

The bulk density was divided by the tap density to calculate the Hausner ratio. The results are shown in Table 4. The Hausner ratios of the test formulations of the Examples were significantly smaller than that of the test formulations of the Comparative Examples, which indicates that the fluidity of the test formulations of the Examples is excellent.

TABLE 4

Hausner Ratio of Test Formulation

| | Hausner Ratio |
|---|---|
| Example 1 | 1.44 |
| Example 2 | 1.40 |
| Example 3 | 1.31 |
| Example 4 | 1.38 |
| Example 5 | 1.35 |
| Example 6 | 1.65 |
| Example 7 | 1.35 |
| Example 8 | 1.57 |
| Example 9 | 1.48 |
| Example 10 | 1.33 |
| Example 11 | 1.08 |
| Example 12 | 1.14 |
| Example 13 | 1.33 |
| Example 14 | 1.26 |
| Example 15 | 1.41 |
| Example 16 | 1.65 |
| Example 17 | 1.25 |
| Example 18 | 1.59 |
| Example 19 | 1.62 |
| Example 20 | 1.79 |
| Example 21 | 1.56 |
| Example 22 | 1.39 |
| Example 23 | 1.39 |
| Comparative Example 1 | 1.89 |
| Comparative Example 2 | 1.86 |

<Measurement of Spray Discharge Percentage>

20 mg of a test formulation was filled in a capsule (HPMC capsule, Size 2, Qualicaps), set in a pabulizer (FORTE GROW MEDICAL Co., Ltd.), and then the weight of the pabulizer was measured. After pushing the pump of the pabulizer only once to spray the test formulation, the weight of the pabulizer was measured again, and the weight difference before and after the spray was used as the amount of spray discharged. The amount of spray discharged (spray discharge percentage) was calculated, in which the weight of the filled test formulation was set to 100%. The results are shown in Table 5. It was shown that the test formulations of the Examples were sprayed at a significantly higher percentage than the test formulations of the Comparative Examples.

TABLE 5

Spray Discharge Percentage from Sprayer of Test Formulation

| | Spray Discharge Percentage from Sprayer (%) |
|---|---|
| Example 1 | 68.2 |
| Example 2 | 59.0 |
| Example 3 | 76.9 |
| Example 4 | 91.5 |
| Example 5 | 70.1 |
| Example 6 | 57.3 |
| Example 7 | 68.0 |
| Example 8 | 52.7 |
| Example 9 | 78.0 |
| Example 10 | 70.6 |
| Example 11 | 66.9 |
| Example 12 | 69.5 |
| Example 13 | 60.2 |
| Example 14 | 72.9 |
| Example 15 | 69.0 |
| Example 16 | 64.7 |
| Example 17 | 57.8 |
| Example 18 | 72.9 |
| Example 19 | 76.6 |
| Example 20 | 64.0 |
| Example 21 | 57.6 |
| Example 22 | 82.1 |
| Example 23 | 79.9 |
| Comparative Example 1 | 12.5 |
| Comparative Example 2 | 17.1 |

The invention claimed is:

1. A medicament comprising a powder formulation for intranasal administration,
    wherein the powder formulation comprises composite particles in which an active ingredient and a crystalline cellulose are cohered to each other,
    wherein the active ingredient is levodopa,
    wherein the crystalline cellulose has an average particle size of about 20 μm and a bulk density of about 0.23 g/cm³, and wherein the composite particles remain cohered at a dispersive pressure of 2 bar.

2. The powder formulation according to claim 1, wherein the composite particles have an average primary particle size of 20 to 350 µm.

3. The powder formulation according to claim 1, wherein the composite particles have a specific surface area of 0.20 to 2.3 m²/g.

4. The powder formulation according to claim 1, wherein the composite particles have a Hausner ratio of 1.8 or less.

5. The powder formulation according to claim 1, wherein the composite particles further comprise a binder.

6. The powder formulation according to claim 1, wherein the composite particles further comprise an absorption enhancer.

7. The powder formulation according to claim 6, wherein the absorption enhancer is hydroxypropyl-β-cyclodextrin, sodium lauryl sulfate or n-dodecyl-β-D-maltoside.

8. A method for manufacturing a powder formulation comprising:
   granulating by agitation a mixture comprising an active ingredient and crystalline cellulose to form composite particles in which the active ingredient and the crystalline cellulose are cohered to each other,
   wherein the active ingredient is levodopa,
   wherein the powder formulation is for intranasal administration,
   wherein the crystalline cellulose has an average particle size of about 20 µm and a bulk density of about 0.23 g/cm³, and
   wherein the composite particles remain cohered at a dispersive pressure of 2 bar.

9. A method for manufacturing a powder formulation comprising:
   granulating in a fluidized bed a mixture comprising an active ingredient and a crystalline cellulose to form composite particles in which the active ingredient and the crystalline cellulose are cohered to each other,
   wherein the active ingredient is levodopa,
   wherein the powder formulation is for intranasal administration,
   wherein the crystalline cellulose has an average particle size of about 20 µm and a bulk density of about 0.23 g/cm³, and
   wherein the composite particles remain cohered at a dispersive pressure of 2 bar.

10. A method for manufacturing a powder formulation comprising:
    lyophilizing a mixture comprising an active ingredient and a crystalline cellulose to form composite particles in which the active ingredient and the crystalline cellulose are cohered to each other,
    wherein the active ingredient is levodopa,
    wherein the powder formulation is for intranasal administration,
    wherein the crystalline cellulose has an average particle size of about 20 µm and a bulk density of about 0.23 g/cm³, and
    wherein the composite particles remain cohered at a dispersive pressure of 2 bar.

11. The manufacturing method according to claim 8, wherein the mixture further comprises a binder.

12. The manufacturing method according to claim 8, wherein the mixture further comprises an absorption enhancer.

13. The manufacturing method according to claim 12, wherein the absorption enhancer is hydroxypropyl-β-cyclodextrin, sodium lauryl sulfate or n-dodecyl-β-D-maltoside.

* * * * *